(12) United States Patent
Shapira et al.

(10) Patent No.: US 11,029,950 B2
(45) Date of Patent: Jun. 8, 2021

(54) REDUCING LATENCY OF COMMON SOURCE DATA MOVEMENT INSTRUCTIONS

(71) Applicant: INTERNATIONAL BUSINESS MACHINES CORPORATION, Armonk, NY (US)

(72) Inventors: Yossi Shapira, Shoham (IL); Yair Fried, Petah Tiqwa (IL); Eyal Naor, Tel Aviv (IL); Amir Turi, Ramat Gan (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/502,231

(22) Filed: Jul. 3, 2019

(65) Prior Publication Data

US 2021/0004228 A1      Jan. 7, 2021

(51) Int. Cl.
*G06F 9/30* (2018.01)
(52) U.S. Cl.
CPC ................ *G06F 9/30032* (2013.01)
(58) Field of Classification Search
CPC .................................................. G06F 9/30032
See application file for complete search history.

(56) References Cited

U.S. PATENT DOCUMENTS

| | | | |
|---|---|---|---|
| 9,880,933 B1 | 1/2018 | Gupta et al. | |
| 2007/0174598 A1* | 7/2007 | Thekkath | G06F 9/3004 712/234 |
| 2010/0186014 A1* | 7/2010 | Vaghani | G06F 3/0604 718/101 |
| 2016/0041909 A1 | 2/2016 | Gu et al. | |
| 2018/0032264 A1 | 2/2018 | Gomez et al. | |
| 2018/0052687 A1* | 2/2018 | Frey | G06F 9/3004 |
| 2018/0349029 A1 | 12/2018 | Mohammadzedeh et al. | |

OTHER PUBLICATIONS

IBM, "z/Architecture—Principles of Operation," IBM Publication No. SA22-7832-11, Twelfth Edition, Sep. 2017, pp. 1-1902.
Mell, Peter and Tim Grance, "The NIST Definition of Cloud Computing," National Institute of Standards and Technology, Information Technology Laboratory, Special Publication 800-145, Sep. 2011, pp. 1-7.

\* cited by examiner

*Primary Examiner* — Michael J Metzger
(74) *Attorney, Agent, or Firm* — Steven Chiu, Esq.; Blanche E. Schiller, Esq.; Heslin Rothenberg Farley & Mesiti P.C.

(57) ABSTRACT

A move data instruction to move data from one location to another location is obtained. Based on obtaining the move data instruction, a determination is made as to whether the data to be moved is located in a buffer. The buffer is configured to maintain the data for use by multiple move data instructions. The buffer is used to move the data from the one location to the other location, based on determining that the data to be moved is in the buffer.

20 Claims, 9 Drawing Sheets

REDUCING LATENCY OF COMMON SOURCE DATA MOVEMENT INSTRUCTIONS

BACKGROUND

One or more aspects relate, in general, to processing within a computing environment, and in particular, to facilitating such processing.

There are many aspects to processing within a computing environment including, but not limited to, moving data from one location to another location. For example, data is moved from a location in memory to another location, such as another location in memory. To move data from one location to another location, in one example, the data is read from the one location, stored in a buffer, and moved from the buffer, at the appropriate time, to the other location. This occurs each time data is moved from one location to another location.

SUMMARY

Shortcomings of the prior art are overcome, and additional advantages are provided through the provision of a computer program product for facilitating processing within a computing environment. The computer program product includes a computer readable storage medium readable by a processing circuit and storing instructions for performing a method. The method includes obtaining a move data instruction. The move data instruction is to move data from one location to another location. Based on obtaining the move data instruction, a determination is made as to whether the data to be moved is located in a buffer. The buffer is configured to maintain the data for use by multiple move data instructions. The buffer is used to move the data from the one location to the other location, based on determining that the data to be moved is in the buffer.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided to reduce latency in processing of data movement instructions. A data movement instruction moves data from a source location to a destination location, and in accordance with an aspect of the present invention, optimizations are obtained when multiple data movement instructions having the same source location are executed. For instance, when a move data instruction is executed, a determination is made as to whether the source data has already been read from memory and placed in a select buffer for a previous move data instruction. If the data has already been read from memory and stored in the select buffer, then the data is not re-read from memory, but instead, copied from the select buffer and written to the destination location. Since memory is not read for each move data instruction, latency is reduced in executing data movement instructions that have a common source.

One embodiment of a computing environment to incorporate and use one or more aspects of the present invention is described with reference to FIG. 1A. In one example, the computing environment is based on the z/Architecture® hardware architecture, offered by International Business Machines Corporation, Armonk, N.Y. One embodiment of the z/Architecture hardware architecture is described in "z/Architecture Principles of Operation," IBM Publication No. SA22-7832-11, Twelfth Edition, September 2017, which is hereby incorporated herein by reference in its entirety. IBM and z/Architecture are registered trademarks of International Business Machines Corporation in at least one jurisdiction.

The computing environment may also be based on other architectures, including, but not limited to, the Power Architecture offered by International Business Machines Corporation and the Intel x86 architecture. Other examples also exist. Power Architecture is a registered trademark of International Business Machines Corporation in at least one jurisdiction. Intel is a trademark or registered trademark of Intel Corporation or its subsidiaries in the United States and other countries.

Figure 1A:
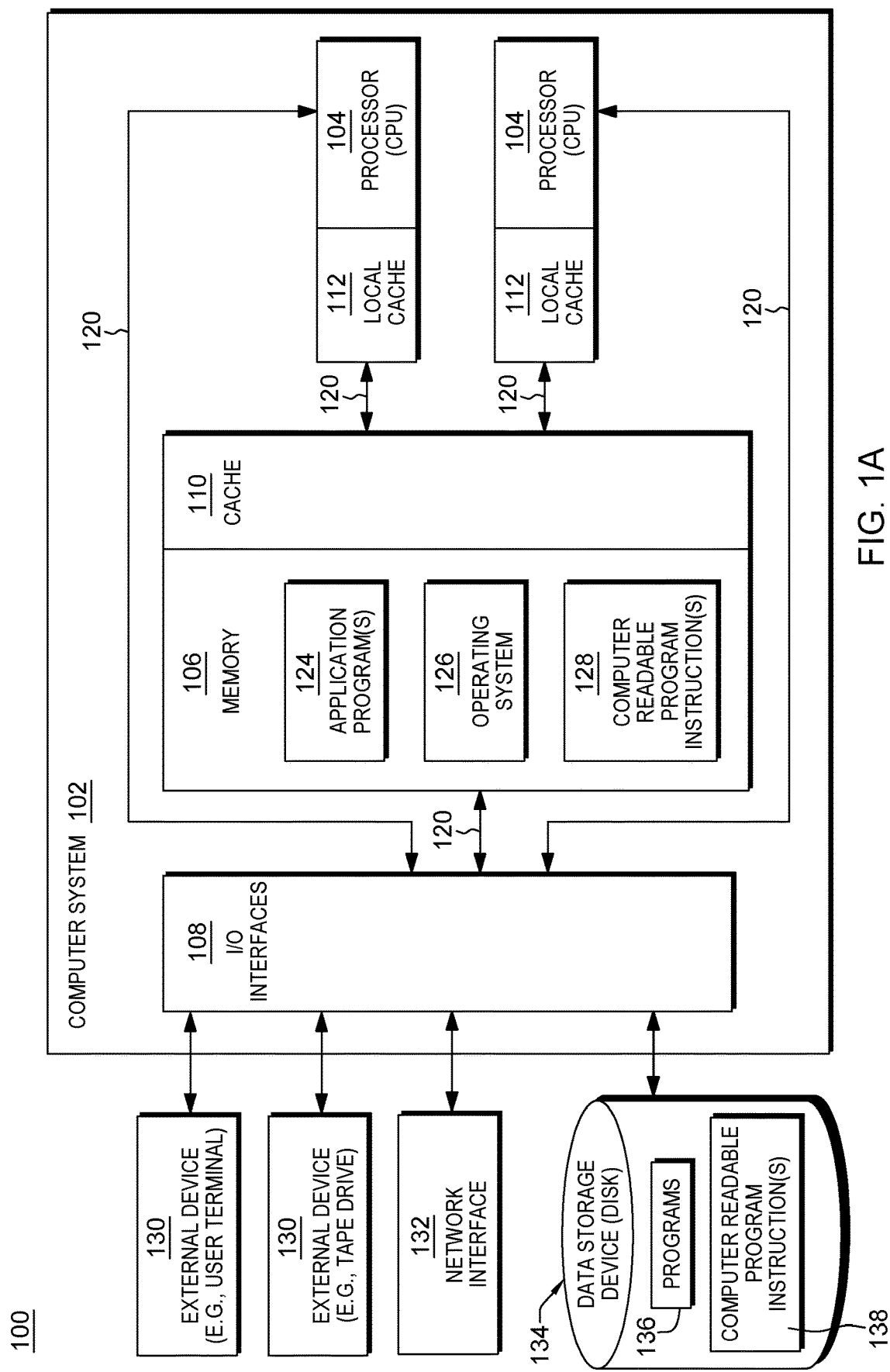
FIG. 1A depicts one example of a computing environment to incorporate and use one or more aspects of the present invention.

As shown in FIG. 1A, a computing environment 100 includes, for instance, a computer system 102 shown, e.g., in the form of a computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 120.

Bus 120 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 110, such as a shared cache, which may be coupled to local caches 112 of processors 104. Memory 106 may include one or more programs or applications 124, an operating system 126, and one or more computer readable program instructions 128. Computer readable program instructions 128 may be configured to carry out functions of embodiments of aspects of the invention.

Computer system 102 may also communicate via, e.g., I/O interfaces 108 with one or more external devices 130, one or more network interfaces 132, and/or one or more data storage devices 134. Example external devices include a user terminal, a tape drive, a pointing device, a display, etc. Network interface 132 enables computer system 102 to communicate with one or more networks, such as a local area network (LAN), a general wide area network (WAN), and/or a public network (e.g., the Internet), providing communication with other computing devices or systems.

Data storage device 134 (a particular example of an external device) may store one or more programs 136, one or more computer readable program instructions 138, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples include, but are not limited to: microcode, device drivers, redundant processing units, external disk drive arrays, RAID systems, tape drives, and data archival storage systems, etc.

Computer system 102 may be operational with numerous other computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
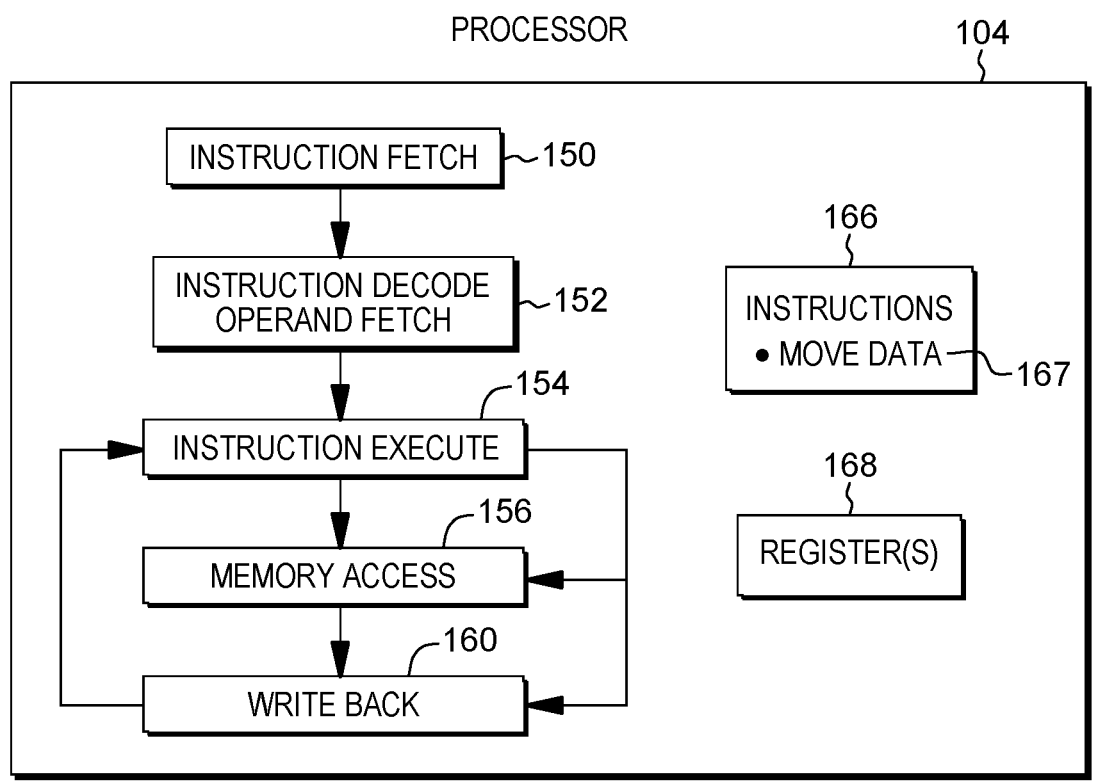
FIG. 1B depicts one example of further details of a processor of FIG. 1A, in accordance with an aspect of the present invention.

Further details regarding one example of processor 104 are described with reference to FIG. 1B. Processor 104 includes a plurality of functional components used to execute instructions. These functional components include, for instance, an instruction fetch component 150 to fetch instructions to be executed; an instruction decode unit 152 to decode the fetched instructions and to obtain operands of the decoded instructions; instruction execution components 154 to execute the decoded instructions; a memory access component 156 to access memory for instruction execution, if necessary; and a write back component 160 to provide the results of the executed instructions. One or more of these components may, in accordance with an aspect of the present invention, be used to execute one or more instructions 166, including, but not limited to, move data instructions 167, and/or other operations/instructions/logic associated therewith.

Processor 104 also includes, in one embodiment, one or more registers 168 to be used by one or more of the functional components. Processor 104 may include additional, fewer and/or other components than the examples provided herein.

One example of a move data instruction in the z/Architecture hardware architecture is a Move Character instruction, aspects of which are described below.

In one example, in execution of the Move Character instruction, a second operand (e.g., source data) of the Move Character instruction is placed at a first operand location (e.g., destination location). Each operand is specified using one or more fields of the instruction. Further, in one example, each operand is processed left to right. When the operands overlap, in one embodiment, the result is obtained as if the operands were processed one byte at a time and each result byte was stored immediately after fetching the operand byte.

Although a Move Character instruction is one example of a move data instruction, other move data instructions exist in the z/Architecture hardware architecture, as well as other hardware architectures, and may benefit from one or more aspects of the present invention.

As indicated, in execution of a move data instruction, data is moved from a source location identified by, for instance, a source address, to a destination location identified by, for instance, a destination address. Some programs use these instructions to read from the same source. For example, it is common for software to initialize data structures to the same value, such as initializing arrays to zero. Thus, the source location is the same for multiple move data instructions, and as such, optimizations may be provided, in accordance with an aspect of the present invention. Further details relating to processing a move data instruction are described with reference to FIGS. 2A-2C.

Figure 2A:
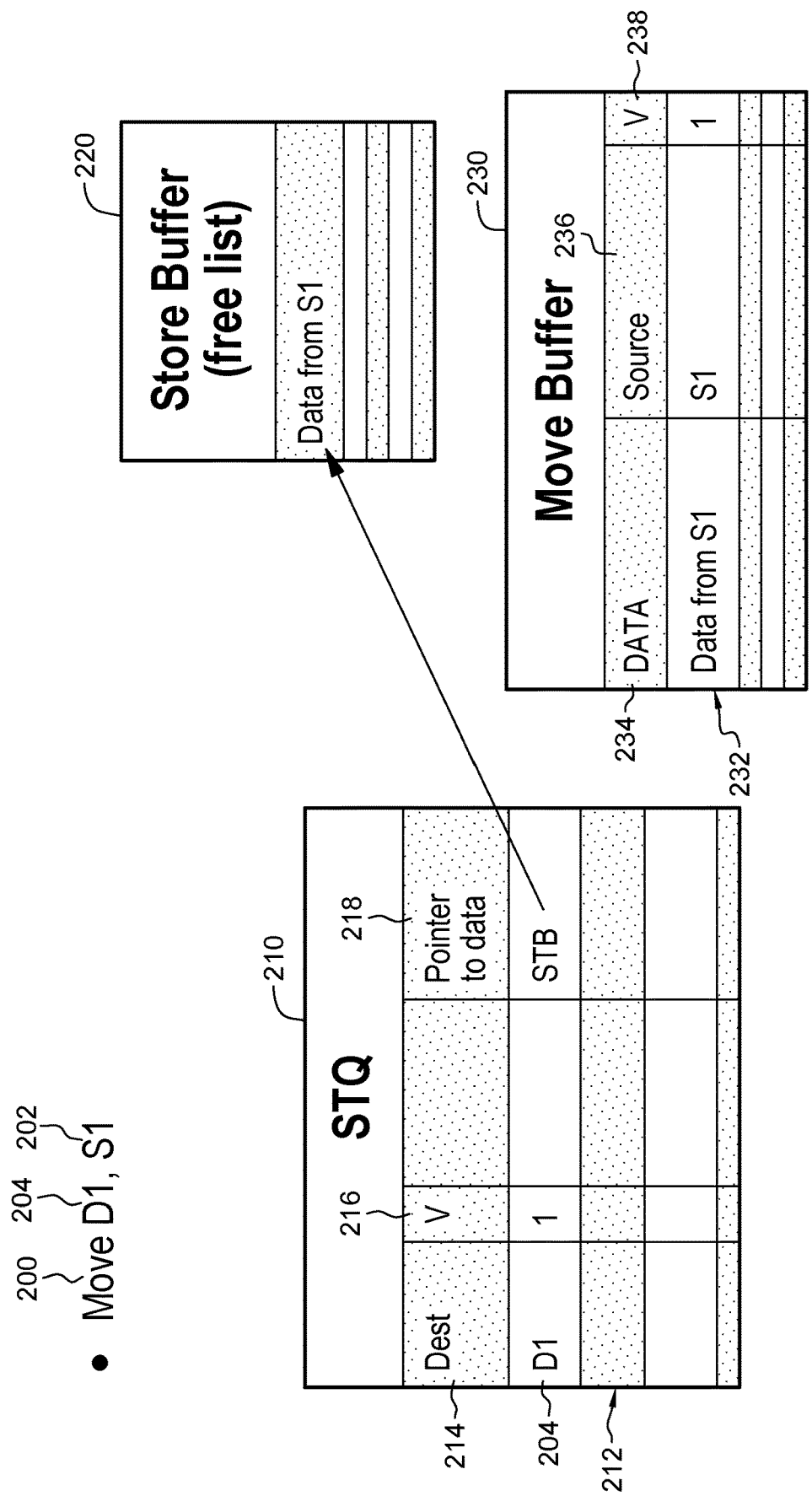
FIGS. 2A-2C depict examples of using a buffer to move data, in accordance with one or more aspects of the present invention.

Referring initially to FIG. 2A, a move instruction (also referred to as a move data instruction) 200 is obtained. The move instruction may be one of many types of move data instructions, such as a Move Character instruction of the z/Architecture hardware architecture or other move data instructions of the z/Architecture hardware architecture or other architectures. As an example, the move instruction includes a source location, S1 202 (e.g., a source address in, e.g., memory, specified using one or more fields of the instruction), and a destination location, D1 204 (e.g., a destination address in, e.g., memory, specified using one or more fields of the instruction). In executing the instruction, in one example, select details of the instruction are added to a store queue (STQ) 210. For instance, store queue 210 includes a plurality of entries 212, and each entry 212 includes a plurality of fields relating to execution of a particular move data instruction, such as a destination (Dest) field 214, a valid (V) indicator field 216 indicating whether the instruction has completed, and a pointer to data field 218 pointing to a location of the data to be moved. The store queue may include additional, fewer and/or other fields, in other embodiments.

The destination location of the instruction, D1 204, is placed on the queue in destination field 214 until the instruction is completed. Based on placing the instruction on the queue, valid indicator 216 for that instruction is set to, e.g., one, and pointer 218 for that instruction points to a buffer, such as a store buffer (STB) 220, where the data to be moved is stored. This is the data read from source location, S1 202. The source data is read from, e.g., memory, such as a cache or other memory, and placed in store buffer 220 until written to the destination indicated by D1 204. After the data is written from store buffer 220 to the destination, it is evicted from the store buffer.

In accordance with an aspect of the present invention, the data read from memory is also placed in another buffer, separate from the store buffer. This other buffer is referred to herein as a move buffer (MVB) 230. Move buffer 230 is, for instance, a hardware buffer. It is, in one example, a dedicated piece of hardware used for a specific task (e.g., maintaining data for one or more sources, as described below). It is coupled to a processor, such as processor 104 (e.g., part of the processor, or separate therefrom but close to the processor), and used by the processor in moving data. Since it is for specific instructions (e.g., move instructions), it is smaller, faster and more power efficient than cache memory, as an example.

Move buffer 230 includes one or more entries 232 (e.g., 4 entries in this example, but any number of entries may be included in the buffer). Each entry 232 includes a plurality of fields, such as a data field 234 that includes data from a particular source (e.g., data from S1 202), a source field 236 indicating the source of the data (e.g., S1), and a valid field 238 indicating whether the data is valid. The move buffer may include additional, fewer and/or other fields, in other embodiments.

Figure 2B:
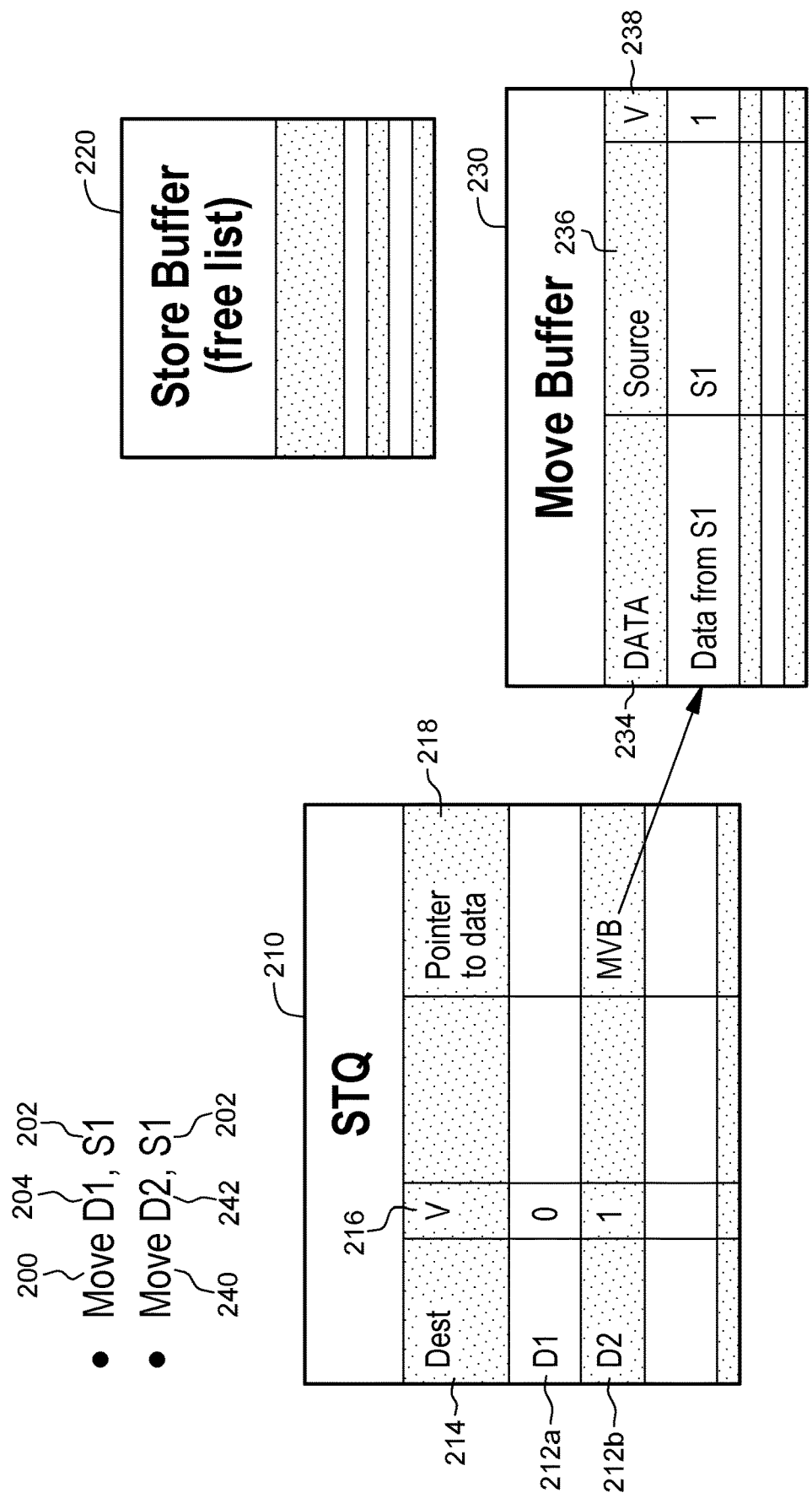

Referring to FIG. 2B, based on a move instruction (e.g., move 200) completing, the valid indicator in valid field 216 of the entry in store queue 210 corresponding to that instruction (e.g., entry 212a having Dest D1) is set to, e.g., zero, and pointer to data field 218 in entry 212a is cleared. Additionally, the store buffer (e.g., store buffer 220) no longer includes the data that was read from the cache or memory and stored in the destination location. However, in accordance with an aspect of the present invention, the data is still stored in another buffer (e.g., move buffer 230), as indicated by valid field 238 (e.g., valid indicator is set to, e.g., one), and therefore, may be used by another move instruction having the same source (e.g., S1 202). For instance, move instruction 240 has the same source as move instruction 200 (e.g., S1 202), but has a different destination (e.g., D2 242).

In one embodiment, move instruction 240 is added to store queue 210 in entry 212b; the valid indicator in valid field 216 of that entry (e.g., entry 212b) is set to, e.g., one; and pointer to data field 218 of that entry (e.g., entry 212b) includes a pointer to the other buffer (e.g., move buffer 230), instead of to the store buffer. Thus, in executing move instruction 240, the data is read from move buffer 230, instead of re-reading the data from a cache or memory to a buffer (e.g., store buffer 220), and stored in the destination indicated by D2 242. This saves the reading of the data from the cache or memory, improving performance of the move instruction and/or the processor executing the move instruction.

Figure 2C:
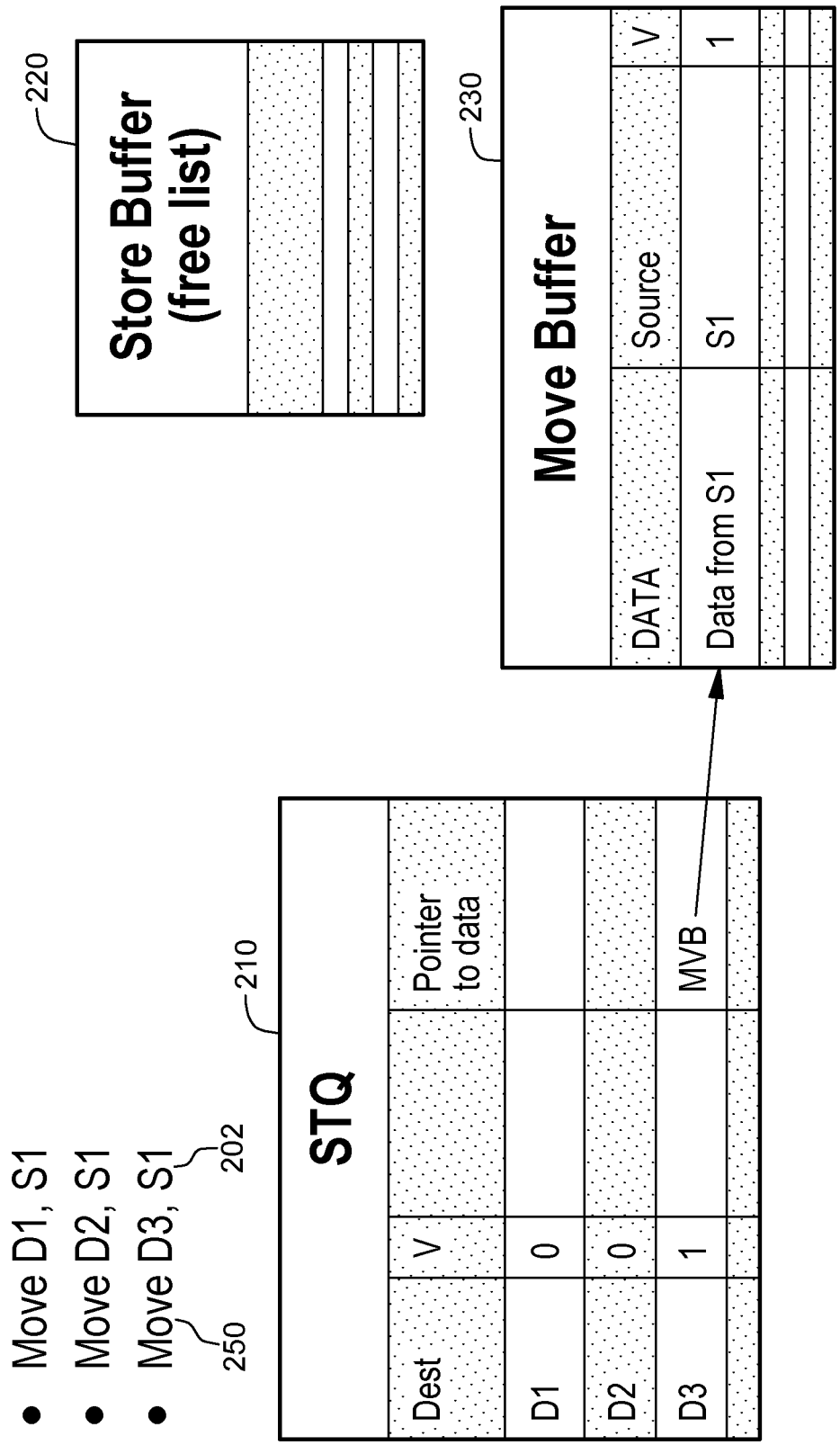

Similarly, referring to FIG. 2C, this same processing is performed for another move instruction 250 that has a same source (e.g., S1 202). Again, move buffer 230 is used to obtain the source data, instead of reading the data from a cache and/or memory. This may continue for each move instruction with the same source, as long as the source data remains valid. If the valid indicator in move buffer 230 indicates that the source data is no longer valid (e.g., valid indicator is set to zero), then the data is not obtained from the move buffer, but instead is read from the cache or memory and placed in store buffer 220 from which it is accessed and stored at the destination location.

The data at the source location is invalid if, for instance, it is overwritten, or the data is evicted from the cache, etc.

Further details relating to processing move data instructions with the same source are described with reference to FIG. 3. In one example, this processing is performed by a processor, such as processor 104.

Figure 3:
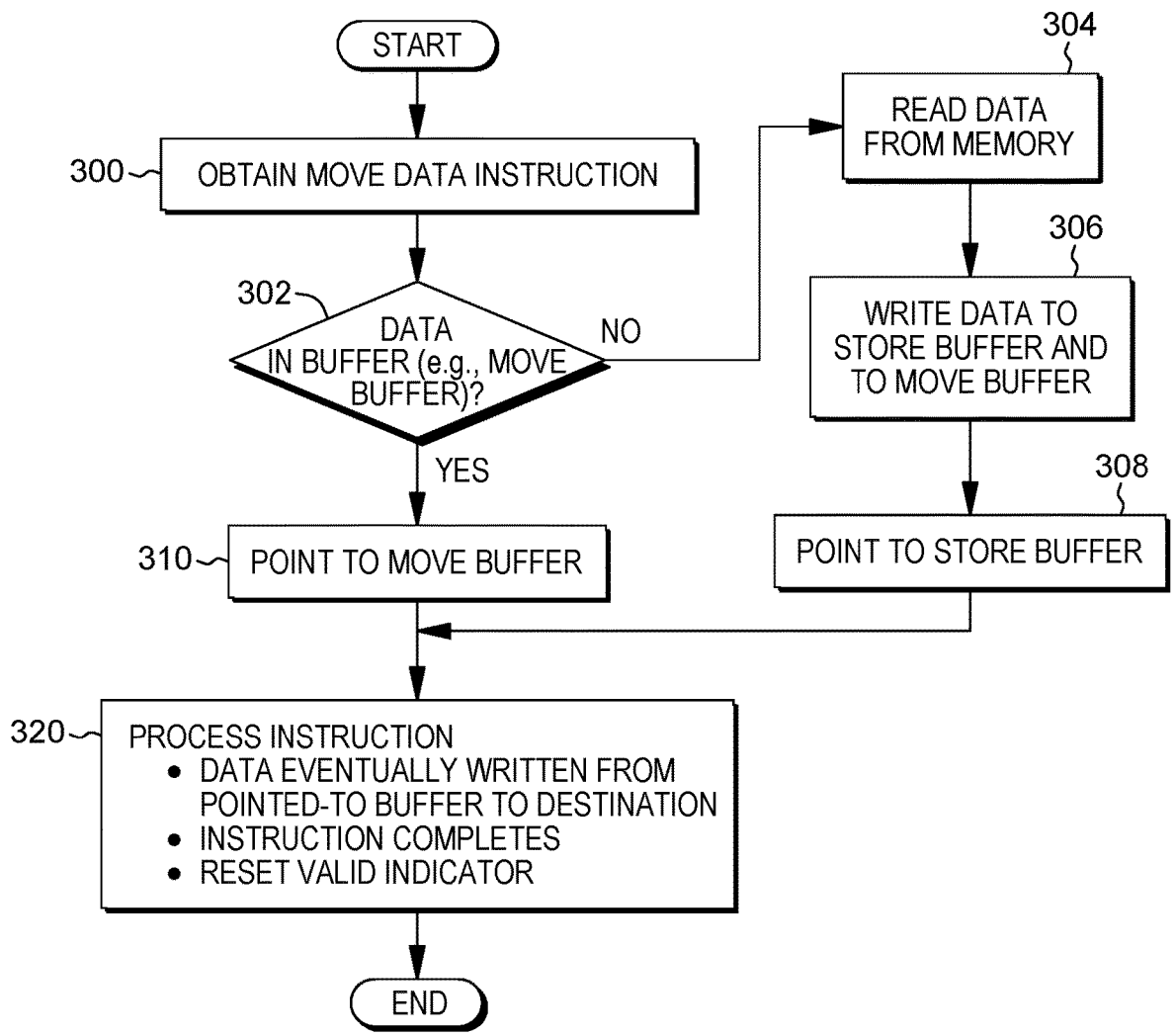
FIG. 3 depicts one example of processing associated with executing a move data instruction, in accordance with an aspect of the present invention.

Referring to FIG. 3, a move data instruction is obtained, STEP 300. A determination is made as to whether the source data for the obtained instruction is in a buffer, such as move buffer 230, INQUIRY 302. For instance, is the data in move buffer 230 (e.g., indicated by the source in source field 236 being equal to the source of the instruction) and the corresponding valid indicator set to valid (e.g., V=1)? If the data is not in the move buffer, then it is read from the source location in memory, STEP 304, and written to a buffer different from the move buffer, such as store buffer 220, STEP 306. It is also written, in accordance with an aspect of the present invention, to a buffer separate from the store buffer, such as move buffer 230, STEP 306. Based on placing the data in, e.g., store buffer 220, a pointer to the store buffer is placed in, e.g., pointer to data field 218 of the entry of the store queue (e.g., store queue 210) corresponding to the obtained move data instruction, STEP 308. Processing of the instruction continues, in which the data is eventually taken from the buffer (e.g., store buffer) and stored at the destination location; the instruction completes; and the valid indicator (e.g., V 216) in the corresponding entry of the store queue is reset (e.g., to zero), STEP 320.

Returning to INQUIRY 302, if the data is in the buffer (e.g., it is in move buffer 230) and the corresponding valid indicator (e.g., V 238) is set to valid (e.g., V=1), then pointer to data field 218 of the entry of the store queue corresponding to the obtained move instruction is set to the buffer (e.g., move buffer 230) for this instruction, STEP 310. Processing of the instruction continues, in which the data is eventually taken from the buffer (e.g., move buffer) and stored at the destination location; the instruction completes; and the valid indicator (e.g., V 216) in the corresponding entry of the store queue is reset (e.g., to zero), STEP 320.

By obtaining, for subsequent move instructions having the same source as a previous move instruction, the data from the move buffer, instead of the store buffer (in which the data is read from memory for each move instruction), performance is improved and power consumption is decreased.

As an example, performance is improved and power consumption is decreased by maintaining the data outside of the memory, including the cache, so that the memory/cache does not need to be read for repeating instructions (e.g., instructions having a common source). Thus, in accordance with an aspect of the present invention, a selected buffer (e.g., a move buffer) used to maintain the data outside of the memory/cache includes the source of the instruction. It is used in storing the data to multiple different destinations. When a move data instruction is received, the buffer (e.g., move buffer) is checked. If the data for the indicated source is included in the buffer (e.g., move buffer 230), then a destination location is added to the store queue and the cache is not read to obtain the data. Then, at a selected time, the data is copied from the buffer (e.g., move buffer 230) and written into the destinations in the memory/cache.

Although separate store and move buffers are described herein, the terms "store" and "move" have no particular meaning. In one or more aspects, there are multiple buffers: one in which the data is evicted after writing the data to a destination (e.g., store buffer), and one in which the data is maintained for multiple data move instructions (e.g., a move buffer). Further, in another embodiment, only one buffer is used, and instead of evicting the data from the buffer (e.g., the store buffer) after it is written, it is maintained for subsequent instructions. Further, in another embodiment, more than two buffers are used. Many variations are possible.

Figure 4A:
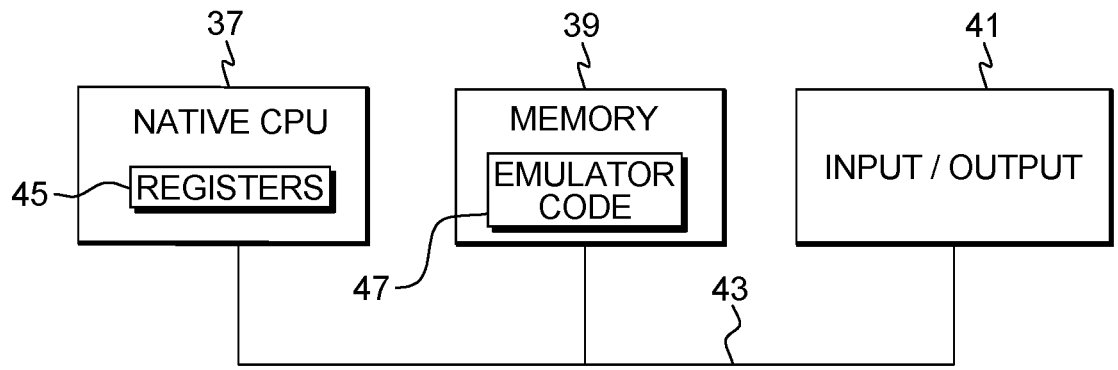
FIG. 4A depicts another example of a computing environment to incorporate and use one or more aspects of the present invention.

Other types of computing environments may also incorporate and use one or more aspects of the present invention, including, but not limited to, emulation environments, an example of which is described with reference to FIG. 4A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC® processor offered by International Business Machines Corporation, Armonk, N.Y.; and/or other machines based on architectures offered by International Business Machines Corporation, Intel Corporation, or other companies. PowerPC is a trademark or registered trademark of International Business Machines Corporation in at least one jurisdiction.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture hardware architecture, such as PowerPC processors, or other servers or processors, to emulate the z/Architecture hardware architecture and to execute software and instructions developed based on the z/Architecture hardware architecture.

Figure 4B:
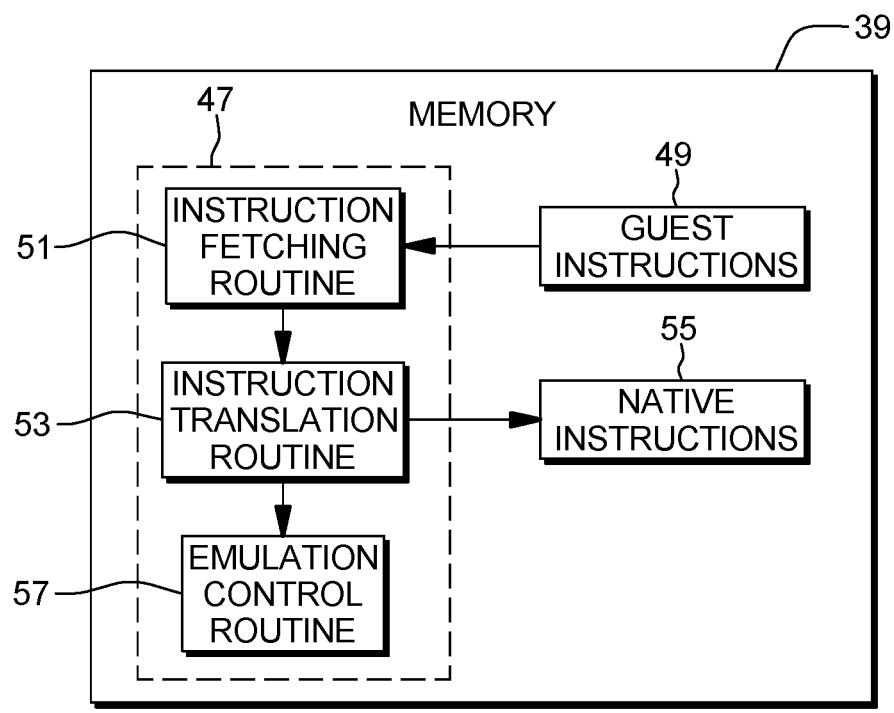
FIG. 4B depicts further details of the memory of FIG. 4A.

Further details relating to emulator code 47 are described with reference to FIG. 4B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture processor, but instead, are being emulated on native CPU 37, which may be, for example, a PowerPC or other processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

As used herein, firmware includes, e.g., the microcode of the processor and/or the system. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

A guest instruction 49 that is obtained, translated and executed may be, for instance, one of the instructions described herein. The instruction, which is of one architecture (e.g., the z/Architecture hardware architecture), is fetched from memory, translated and represented as a sequence of native instructions 55 of another architecture (e.g., PowerPC, Intel, etc.). These native instructions are then executed.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
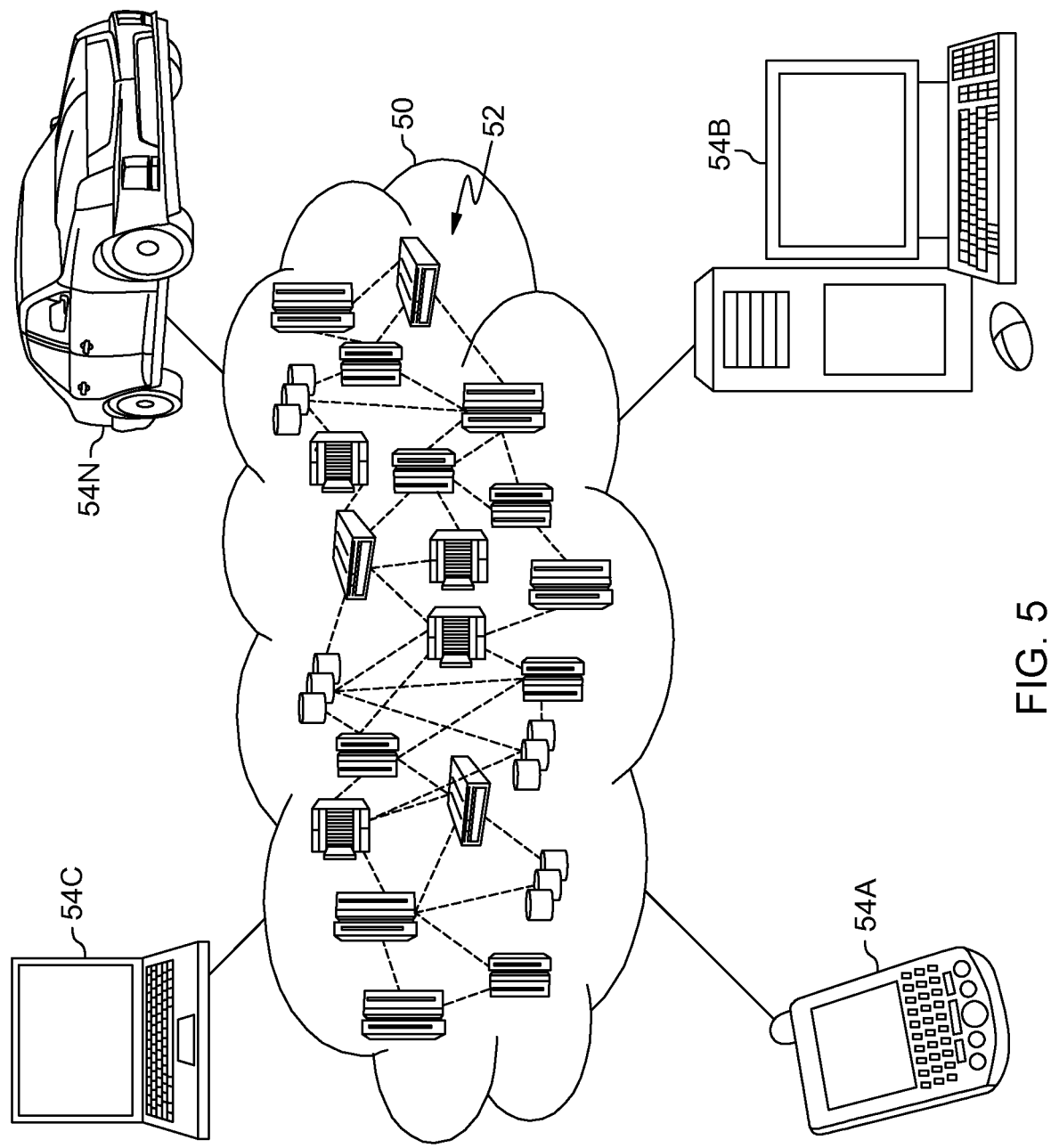
FIG. 5 depicts one embodiment of a cloud computing environment.

Referring now to FIG. 5, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 6:
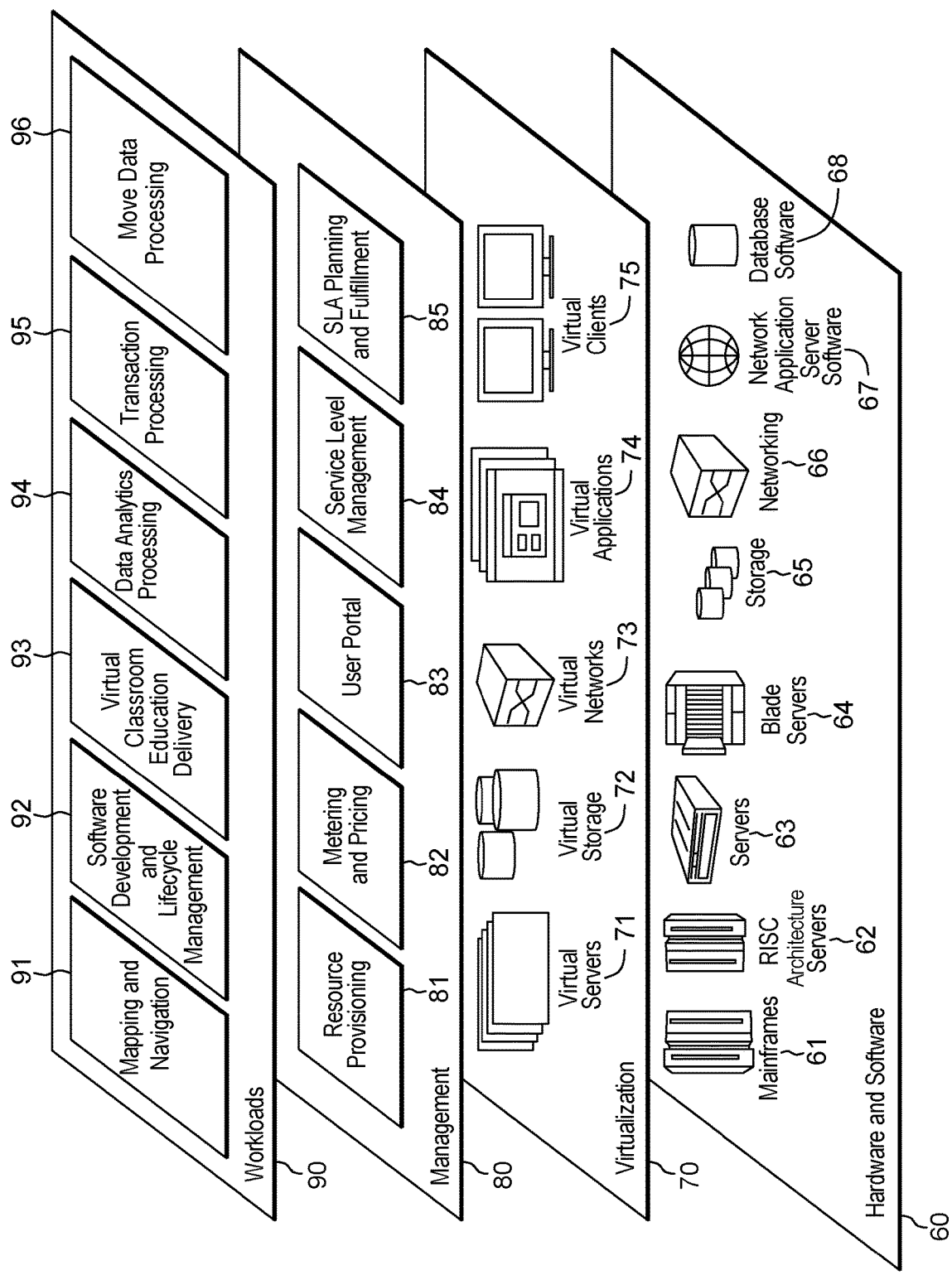
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and move data processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Yet further, other move buffers or other mechanisms to hold the source data may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    at least one computer readable storage medium readable by at least one processing circuit and storing instructions for performing a method comprising:
        obtaining a move data instruction, the move data instruction to move data from one location to another location;
        determining, based on obtaining the move data instruction, whether the data to be moved is already located in a buffer based on a previous move data instruction, the buffer configured to maintain the data for use by multiple move data instructions, wherein the data in the buffer is the same data to be moved for the previous move data instruction and the move data instruction; and
        using the buffer to move the data from the one location to the other location, based on determining that the data to be moved is in the buffer, wherein the data is not re-written to the buffer.

2. The computer program product of claim 1, wherein the method further comprises setting a pointer to the buffer to use the buffer to move the data from the one location to the other location, based on determining that the data to be moved is in the buffer.

3. The computer program product of claim 1, wherein the using comprises copying the data from the buffer to the other location at a select time to complete the move data instruction.

4. The computer program product of claim 1, wherein the buffer comprises a valid indicator, the valid indicator set to a select value indicates that the data stored in the buffer is valid.

5. The computer program product of claim 1, wherein the buffer includes a plurality of entries, and an entry of the plurality of entries includes data for a particular source of the data.

6. The computer program product of claim 5, wherein the entry includes an indication of the particular source of the data, the data, and a valid indicator indicating validity of the data.

7. The computer program product of claim 1, wherein the method further comprises reading the data to be moved from memory and writing the data read from memory into the buffer, based on execution of the previous move data instruction.

8. The computer program product of claim 1, wherein the method further comprises reading the data from memory and writing the data to another buffer, based on determining that the data to be moved is not in the buffer, the other buffer being separate from the buffer and used in moving the data from the one location to the other location.

9. The computer program product of claim 8, wherein the method further comprises storing the data read from memory in the buffer, based on determining that the data to be moved is not in the buffer, wherein the buffer is used in execution of another move data instruction.

10. The computer program product of claim 1, wherein the one location and the other location are specified by the move data instruction.

11. A computer system for facilitating processing within a computing environment, the computer system comprising:
    a memory;
    a processor in communication with the memory; and
    a buffer coupled to the processor, the buffer configured to maintain data for use by a multiple move data instructions, wherein the computer system is configured to perform a method, said method comprising:
        obtaining, by the processor, a move data instruction, the move data instruction to move data from one location to another location;
        determining, based on obtaining the move data instruction, whether the data to be moved is already located in the buffer based on a previous move data instruction, wherein the data in the buffer is the same data to be moved for the previous move data instruction and the move data instruction; and
        using the buffer to move the data from the one location to the other location, based on determining that the data to be moved is in the buffer, wherein the data is not re-written to the buffer.

12. The computer system of claim 11, wherein the buffer includes a plurality of entries, and an entry of the plurality of entries includes data for a particular source of the data.

13. The computer system of claim 11, wherein the method further comprises reading the data to be moved from memory and writing the data read from memory into the buffer, based on execution of the previous move data instruction.

14. The computer system of claim 11, wherein the method further comprises reading the data from memory and writing the data to another buffer, based on determining that the data to be moved is not in the buffer, the other buffer being separate from the buffer and used in moving the data from the one location to the other location.

15. The computer system of claim 14, wherein the method further comprises storing the data read from memory in the buffer, based on determining that the data to be moved is not in the buffer, wherein the buffer is used in execution of another move data instruction.

16. A computer-implemented method of facilitating processing within a computing environment, the computer-implemented method comprising:
    obtaining a move data instruction, the move data instruction to move data from one location to another location;
    determining, based on obtaining the move data instruction, whether the data to be moved is already located in a buffer based on a previous move data instruction, the buffer configured to maintain the data for use by multiple move data instructions, wherein the data in the buffer is the same data to be moved for the previous move data instruction and the move data instruction; and
    using the buffer to move the data from the one location to the other location, based on determining that the data to be moved is in the buffer, wherein the data is not re-written to the buffer.

17. The computer-implemented method of claim 16, wherein the buffer includes a plurality of entries, and an entry of the plurality of entries includes data for a particular source of the data.

18. The computer-implemented method of claim 16, further comprising reading the data to be moved from memory and writing the data read from memory into the buffer, based on execution of the previous move data instruction.

19. The computer-implemented method of claim 16, further comprising reading the data from memory and writing the data to another buffer, based on determining that the data to be moved is not in the buffer, the other buffer being separate from the buffer and used in moving the data from the one location to the other location.

20. The computer-implemented method of claim 19, further comprising storing the data read from memory in the buffer, based on determining that the data to be moved is not in the buffer, wherein the buffer is used in execution of another move data instruction.

* * * * *